United States Patent [19]
Ito et al.

[11] Patent Number: 5,835,023
[45] Date of Patent: Nov. 10, 1998

[54] SELECTIVE RADIO PAGING SYSTEM AND PAGER

[75] Inventors: Shogo Ito, Yokohama; Yoshiaki Hirai, Urawa; Nobuyuki Nanba, Hiroshima; Toshihiro Nozawa, Iida, all of Japan

[73] Assignee: NTT Mobile Communications Network Inc., Tokyo, Japan

[21] Appl. No.: 708,874

[22] Filed: Sep. 5, 1996

Related U.S. Application Data

[63] Continuation of Ser. No. 325,398, filed as PCT/JP94/00289 Feb. 24, 1994, published as WO94/19879 Sep. 1, 1994, abandoned.

[30] Foreign Application Priority Data

Feb. 25, 1993 [JP] Japan ................................. 5-036963

[51] Int. Cl.⁶ .................................................. G08B 5/22
[52] U.S. Cl. ................................. 340/825.44; 371/69.1; 455/343
[58] Field of Search ................ 340/825.44; 455/38.1, 455/38.3, 343; 371/69.1

[56] References Cited

U.S. PATENT DOCUMENTS

| | | | |
|---|---|---|---|
| 4,173,808 | 11/1979 | Gaskill et al. | 340/825.44 |
| 4,523,332 | 6/1985 | Mori | 455/343 |
| 4,668,949 | 5/1987 | Akahori et al. | 340/825.44 |
| 4,908,828 | 3/1990 | Tikalsky | 371/69.1 |
| 4,914,649 | 4/1990 | Schwendeman | 340/825.44 |
| 5,109,530 | 4/1992 | Stengel | 455/343 |
| 5,142,279 | 8/1992 | Jasinski | 340/825.44 |
| 5,175,874 | 12/1992 | Auchter | 455/343 |
| 5,230,084 | 7/1993 | Nguyen | 455/343 |
| 5,265,270 | 11/1993 | Stengel | 455/343 |
| 5,274,369 | 12/1993 | Tsunoda | 455/343 |
| 5,384,564 | 1/1995 | Wycoff | 455/343 |

FOREIGN PATENT DOCUMENTS

| | | |
|---|---|---|
| 639898 | 4/1994 | European Pat. Off. . |
| 57-41044 | 3/1982 | Japan . |
| 2-44821 | 2/1990 | Japan . |

*Primary Examiner*—Brian Zimmerman
*Attorney, Agent, or Firm*—Cushman Darby & Cushman IP Group of Pillsbury Madison & Sutro LLP

[57] ABSTRACT

In a mobile radio communication system wherein, in order to call a receiver from a base station, a paging signal containing address information corresponding to the receiver to be called is transmitted n times, the position of a paging signal that is transmitted for the second or subsequent time is determined, in accordance with a prearranged rule, in relation to the position of the same paging signal when it was transmitted for the first time, and the receiver achieves more efficient battery savings by stopping its receiving operation with respect to signal portions which have been confirmed as having already been received without error. The receiving operation is intermittently stopped at a timing corresponding to identical signal portions of the same repeatedly received paging signal.

14 Claims, 12 Drawing Sheets

| sync. signal | paging signal A (transmission no. m) | paging signal B (transmission no. m) | paging signal C (transmission no. m) | paging signal D (transmission no. m) |

Fig.12a Constitution of time $s0+mT$ frame.

| sync. signal | paging signal A (transmission no. m+1) | paging signal B (transmission no. m+1) | paging signal C (transmission no. m+1) | paging signal D (transmission no. m+1) |

Fig.12b Constitution of time $s0+(m+1)T$ frame.

SELECTIVE RADIO PAGING SYSTEM AND PAGER

This a continuation of application Ser. No. 08/325,398, filed as PCT/JP94/00289 Feb. 24, 1994, published as WO94/19879 Sep. 1, 1994, which was abandoned upon the filing hereof.

TECHNICAL FIELD

This invention is utilized for the paging of mobile units in a mobile radio communication system. It relates in particular to technology for reducing the time that power is being consumed by the batteries of a mobile unit—in other words, to battery savings—and it is particularly suited to being utilized in selective radio paging systems.

BACKGROUND OF THE INVENTION

In a mobile radio communication system that uses portable mobile units, it is essential for at least those functions in the mobile unit which operate in response to a call to be kept constantly operational, so that a mobile unit can be paged at any time. However, because mobiles are portable, the capacity of the batteries can be increased only so far, and battery savings has therefore been practiced for some time. This battery savings will now be explained for the example of a selective radio paging system.

A selective radio paging system employs radio waves to selectively call a moving individual. A subscriber who intends to receive this service will always carry a pager. This pager operates on a built-in battery, and the pager circuits must be constantly powered while the subscriber is out and about, so that he or she can always be called. Battery savings has therefore been practised for some time in order to make batteries of limited capacity last as long as possible.

Figure 1:
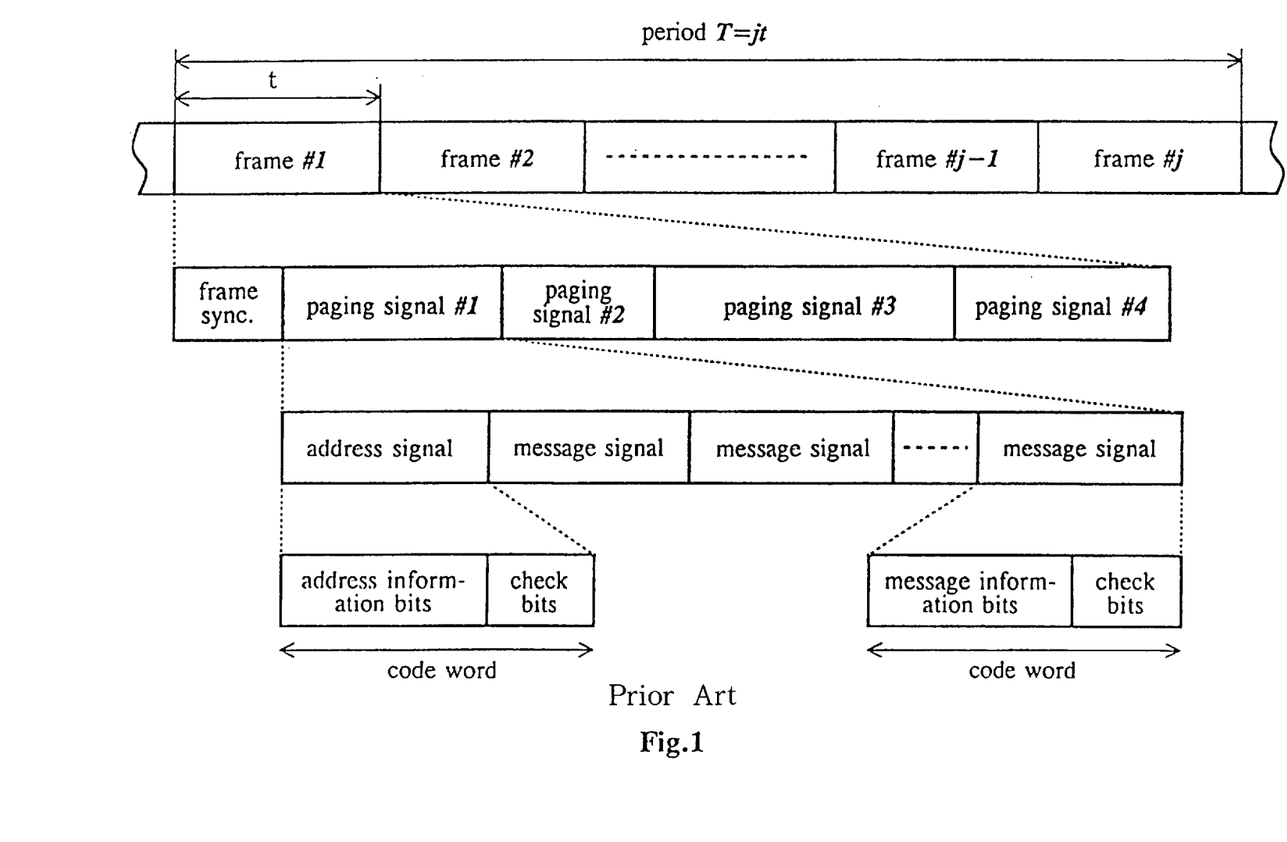
FIG. 1 shows a conventional frame signal format.
Figure 2:
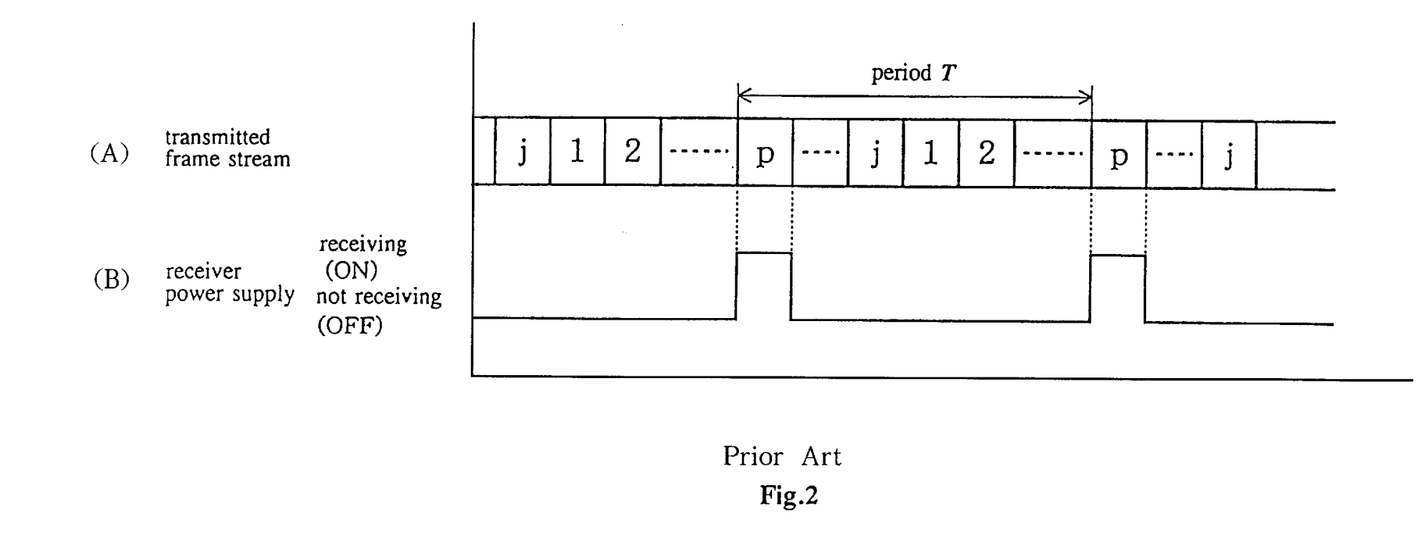
FIG. 2 shows the operation of conventional battery savings.

A conventionally used battery savings method will be explained with reference to FIG. 1 and FIG. 2. FIG. 1 shows a conventional frame signal format, and FIG. 2 shows the operation of conventional battery savings. As shown in FIG. 1, the signal transmitted from a base station consists of signals of period T=jt which comprise j frames of signal length t connected together. Each frame comprises a frame synchronization signal and a plurality of paging signals of arbitrary length for selectively calling pagers which have been set to receive this frame. The paging signals comprise an address signal and, connected to this, message signals. The address signal is constituted by adding check bits to address information bits, and the message signals are constituted by adding check bits to message information bits. The smallest unit including added check bits is called a "code word". In the example depicted in FIG. 1, the address signal and the message signals each constitute a single code word. It is also feasible for the address signal and the message signals each to comprise a plurality of code words. The pagers are divided into j groups, and pagers that belong to group p ($1 \leq p \leq j$) perform battery savings by carrying out intermittent reception, whereby, as shown in FIG. 2, the pagers are in a receiving state only during the group p reception time (this will be described by saying that the pagers have been assigned to group p).

Figure 3A:
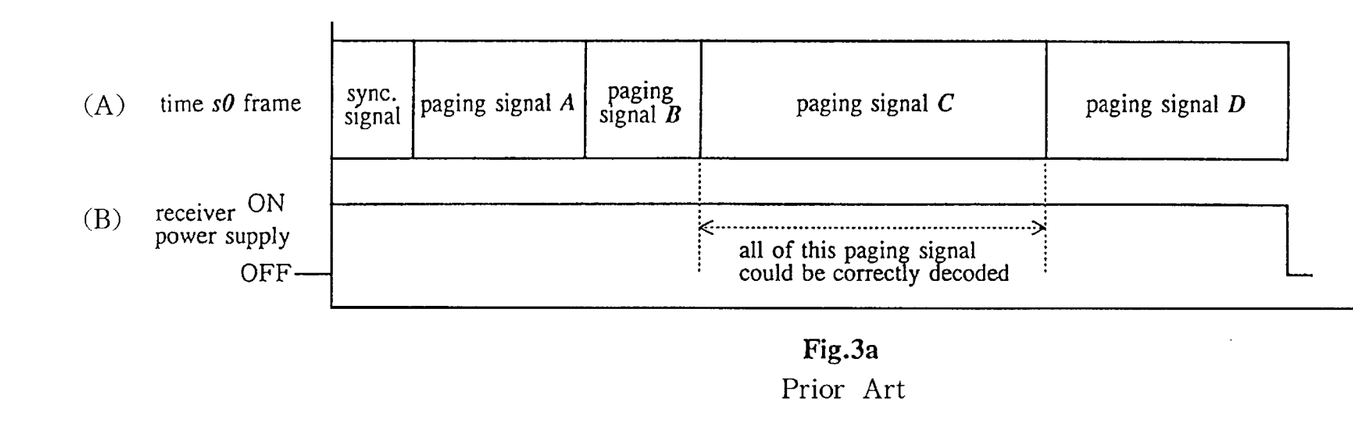
Figure 3B:
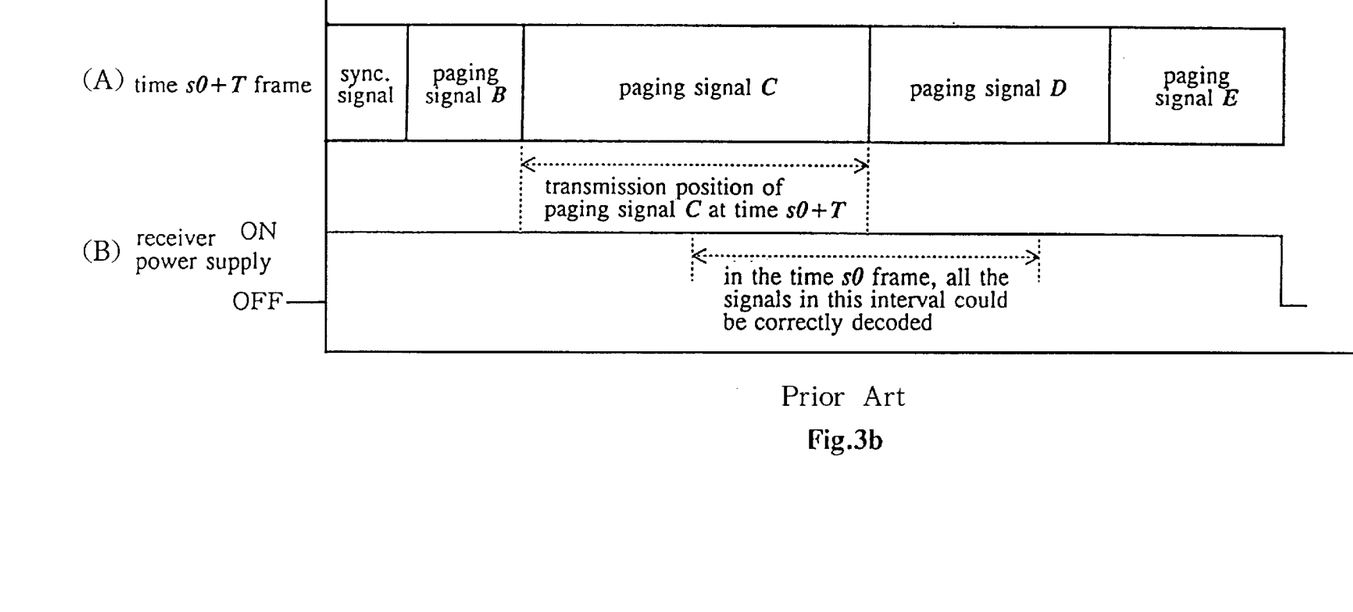
FIG. 3b shows the corresponding time sO+T frame and receiving state.

FIGS. 3a and 3b show an example of a conventional frame constitution plus the timing of the reception battery savings, in the case where identical paging signals are transmitted n times from a base station. It will be assumed that a pager which has been assigned to group p receives first of all the frame sent from the base station at time sO (this will hereinafter be termed the "time sO frame"), and next receives the frame sent at time sO+T (likewise, this will be termed the "time sO+T frame"). FIG. 3a shows the time sO frame and receiving state, while FIG. 3b shows the corresponding time sO+T frame and receiving state. In the example illustrated here, four paging signals A, B, C and D of different lengths are contained in the time sO frame. These paging signals have been transmitted a different numbers of times, and it is assumed here that paging signal A is being transmitted for the $n^{th}$ time, paging signal B for the $m^{th}$ time (m<n), paging signal C for the $h^{th}$ time (h<m<n), and paging signal D for the first time. If the time sO frame is constituted in this manner, then the n transmissions of paging signal A are completed in this time sO frame, and so paging signal A will not be transmitted in the time sO+T frame. Furthermore, in this time sO+T frame, paging signals B, C and D are shifted to the left to fill the resulting gap, and a new paging signal E is transmitted following paging signals B, C and D.

Now, let it be assumed that a receiver has received the entire signal in the time sO frame, and that all the code words which comprise paging signal C have been correctly decoded. In this case, although the contents of paging signal C are known and it is therefore unnecessary to receive paging signal C in subsequent frames, at the following time sO+T frame, the position of paging signal C cannot be predicted and so the entire frame signal including paging signal C will be received. Reception of paging signal C in the time sO+T frame therefore results in unnecessary consumption of power. In other words, with a signal format of this kind, because the position of a paging signal within the frame signal in each transmission period is indeterminate, efficient battery savings cannot be carried out.

The purpose of the present invention is to overcome this problem and to provide a mobile radio communication system in which efficient battery savings can be performed at the receivers.

SUMMARY OF THE INVENTION

A mobile radio communication system according to this invention is characterized in that, in a mobile radio communication system which has a plurality of receivers to each of which an address has been assigned, and a base station which transmits a paging signal n times (where n is a predetermined integer equal to or greater than 2) to a receiver which is to be called, the paging signal containing address information corresponding to that receiver. Check bits for error detection or correction are added to the paging signals, and receivers have a means which uses the check bits contained in the received paging signals to perform error detection or correction of those paging signals. The position of a paging signal that is transmitted for the second or subsequent time is determined, in accordance with a prearranged rule, in relation to the position of the same paging signal when it was transmitted for the first time; and the receivers include a means which, in respect of signal portions that have been confirmed as having been received without error, stops the receiving operation of the receiver with a timing corresponding to identical signal portions of the same repeatedly received paging signal.

The unit of transmission from the base station is a frame containing one or more paging signals. Identical paging signals are transmitted repeatedly by means of n frames, and the position of identical paging signals within the frames can be determined by means of a prearranged rule.

The signal format disclosed in Jap. Pat. Appl. No. 5-12822 (not yet published when this application was filed)

can be used as a signal format in which the position of paging signals is determined in a systematic way. Each frame will then be composed of n fixed-length subframes, and one or more new paging signals are inserted into the first subframe of a frame, while paging signals which are being transmitted for the $m^{th}$ time are inserted into the $m^{th}$ subframe of the frame. Given this format, the position of the subframe which contains the same paging signals will change regularly with each frame, and its timing can be predicted at the receiver.

When a signal format of this kind is used, the means which stops the receiving operation may perform battery savings in subframe units or in paging signal units within a subframe. Alternatively, it may perform battery savings in smaller units: for example, the unit may be the smallest code word for which error detection or correction can be carried out by means of a series of check bits.

More specific explanations will now be given. To perform battery savings in subframe units, when it has been confirmed that the signal of the $i^{th}$ subframe in a given frame has been received without error in that frame or in a previous frame, reception is stopped for the $i+1^{th}$ subframe in the next frame. To perform battery savings in paging signal units, when it has been confirmed that a certain paging signal of the $i^{th}$ subframe in a given frame has been received without error in that frame or in a previous frame, reception is stopped for the signal at the same position in the $i+1^{th}$ subframe in the next frame. To perform battery savings where the unit is the smallest code word for which error detection or correction can be carried out by means of a series of check bits, when it has been confirmed that a certain code word of the $i^{th}$ subframe in a given frame has been received without error in that frame or in a previous frame, reception is stopped for the signal at the same position in the $i+1^{th}$ subframe in the next frame.

Although the subframes are of fixed length, the paging signals that are inserted into them may be of different lengths. For example, in the case of a selective radio paging system, variable-length message information may be contained in the paging signals. Under such circumstances, the position of the paging signals in a subframe will not be regular, but the paging signals will be in identical positions in corresponding subframes, and their positions can be easily predicted at the receiver side.

It is also feasible to reverse the order of the subframes, in which case new paging signals are inserted in the $n^{th}$ subframe and paging signals which are being transmitted for the $n^{th}$ time are inserted in the first subframe. However, given the need to synchronize frame reception, it is desirable to be sure of receiving the first signal of a frame, and therefore desirable for new paging signals to be inserted in the first subframe.

The position of the paging signals can also be fixed from one frame to the next. That is to say, a frame with an identical arrangement of paging signals can be transmitted n times. In this case as well, battery savings can be performed in frame units, paging signal units, or code word units.

The receiver used in a mobile radio communication system of this sort has a number storage means which stores the address assigned to that receiver; a receiving means which receives the paging signals which the base station transmits n times (where n is a predetermined integer equal to or greater than 2); a means which uses the check bits contained in the received paging signals to perform error detection or correction of those paging signals; and a means which performs call processing when the address information contained in a received paging signal matches the address that has been stored in the number storage means. These receivers are characterised in that the position of a paging signal that is received for the second or subsequent time can be predicted from the position of the same paging signal when it was received for the first time; and in that it has a means which, in respect of signal portions that have been confirmed as having been received without error, stops the receiving operation of the receiver with a timing corresponding to identical signal portions of the same repeatedly received paging signal.

This invention is particularly suited to utilization in selective radio paging systems, and can be utilized in similar fashion in the paging of receivers in other mobile radio communication systems: for example, in the paging of portable telephones.

BRIEF DESCRIPTION OF THE DRAWINGS

FIGS. 3a and 3b show an example of a conventional frame constitution plus the timing of the reception battery savings, in the case where identical paging signals are transmitted n times from a base station. FIG. 3a shows the time sO frame and receiving state, while

FIGS. 5a and 5b show an example of a frame signal format which is suited to implementing this invention. FIG. 5a shows the constitution of the time sO frame, while

FIGS. 12a and 12b show another example of a frame constitution which is suited to implementing this invention. FIG. 12a shows the constitution of the time sO+mT frame, while

OPTIMUM CONFIGURATION FOR EMBODYING THIS INVENTION

Figure 4:
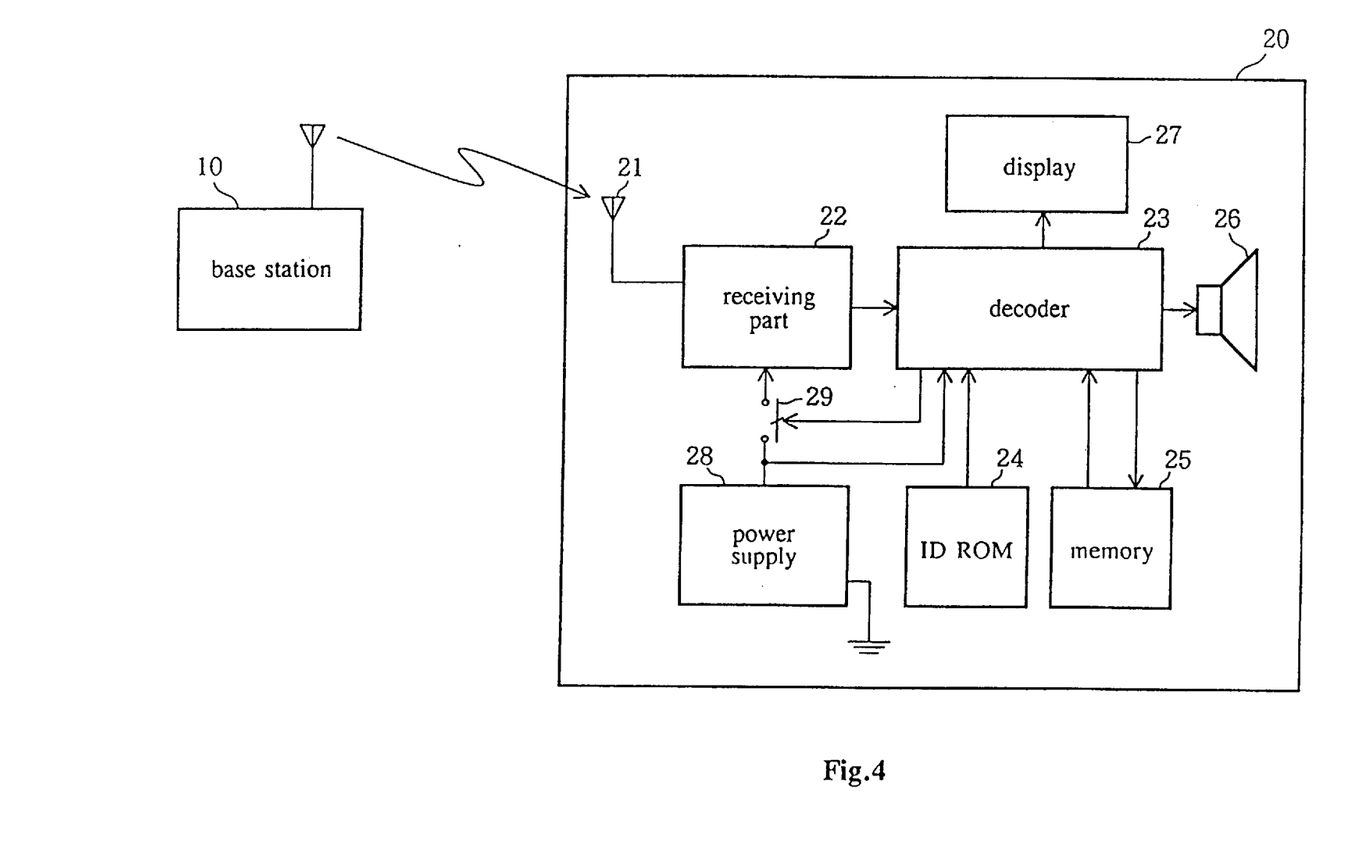
FIG. 4 is a block diagram showing a selective radio paging system according to an embodiment of this invention.

The constitution of an embodiment of this invention will be explained with reference to FIG. 4. This embodiment has pagers 20 (only one is illustrated in the drawing) which serve as a plurality of receivers to each of which an address has been assigned. It also has base station 10 which transmits a paging signal n times (where n is a predetermined integer equal to or greater than 2) to a receiver which is to be called.

The paging signal contains address information corresponding to that receiver 20. Check bits for carrying out error detection or correction are added to the paging signals, and pagers 20 are equipped with decoder 23 as a means which uses the check bits contained in the received paging signals to perform error detection or correction of those paging signals.

Pager 20 is also provided with antenna 21, receiving part 22, ID ROM 24, memory 25, speaker 26, display 27, power supply 28 and battery savings switch 29. Antenna 21 and receiving part 22 receive frames which base station 10 transmits. ID ROM 24 stores the address that has been assigned to this pager. Memory 25 stores received paging signals. Decoder 23 not only performs error detection or correction of received signals, but also carries out call processing when the address information in a paging signal contained in the received frame matches the address stored in ID ROM 24. Namely, an alert signal is sent to speaker 26 and, if the message information following the address information could be correctly decoded, the message is displayed by display 27. A liquid crystal display device may be used as display 27.

The distinguishing features of this embodiment are as follows. Namely, the position of a paging signal that is transmitted for the second or subsequent time is determined, in accordance with a prearranged rule, in relation to the position of the same paging signal when it was transmitted for the first time. Also, with respect to signal portions that have been confirmed as having been received without error, pager 20 stops the receiving operation of receiving part 22 by opening battery savings switch 29 with a timing corresponding to identical signal portions of the same repeatedly received paging signal.

Figure 5A:
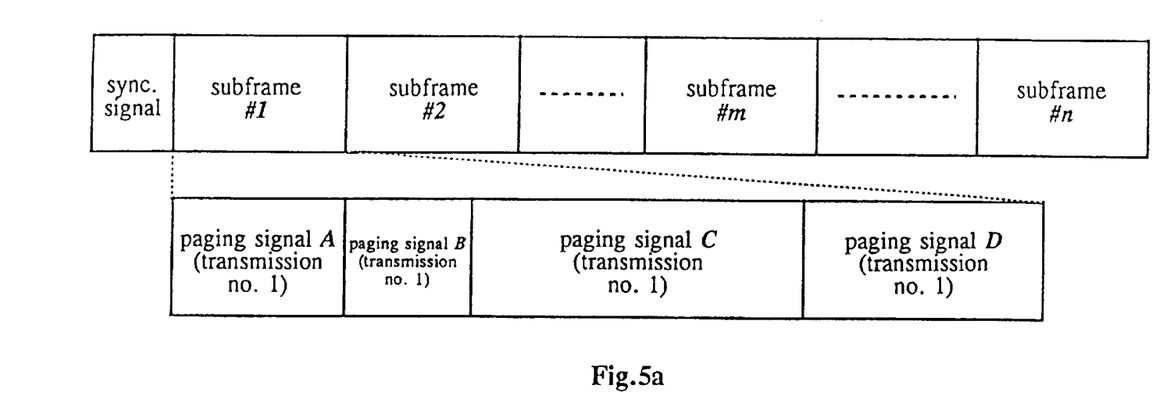
Figure 5B:
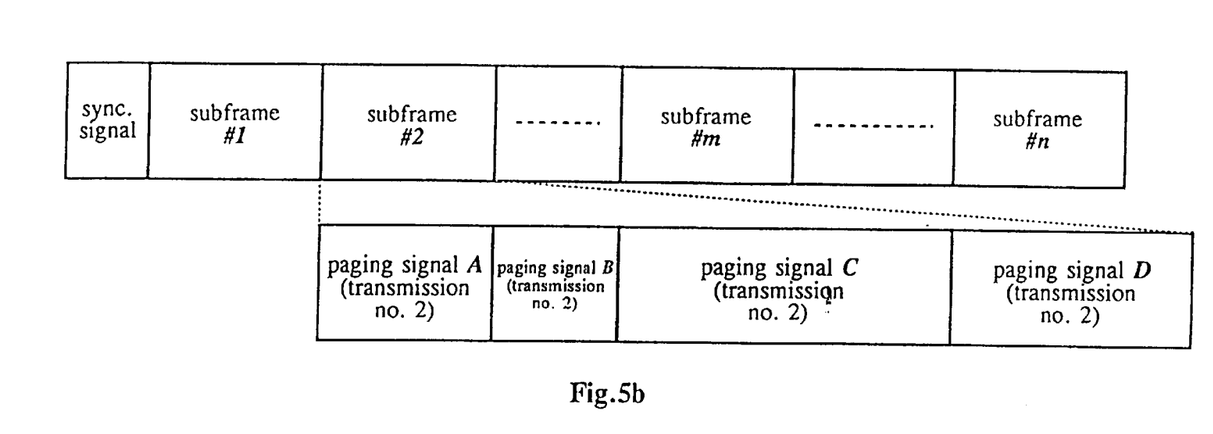
FIG. 5b shows the constitution of the time sO+T frame.

FIGS. 5a and 5b show an example of a frame signal format that is suited to implementing this invention. It is assumed here that a pager which has been assigned to group p first of all receives the time sO frame and next receives the time sO+T frame. FIG. 5a shows the constitution of the time sO frame, while FIG. 5b shows the constitution of the time sO+T frame.

Frames transmitted from base station 10 are internally constituted of a frame synchronization signal followed by n fixed-length subframes, and one or more new paging signals are inserted in the first subframe, while paging signals that are being transmitted for the $m^{th}$ time are inserted in the $m^{th}$ subframe. The position of a given set of paging signals will shift by one subframe every frame. Referring to the example depicted in FIGS. 5a and 5b, if paging signals A, B, C and D have been inserted in the first subframe of the time sO frame, then, in the time sO+T frame, these paging signals A, B, C and D will be inserted in the second subframe, and in the time sO+(k−1)T frame (where k=1, . . . , n), they will be inserted in the $k^{th}$ subframe. Transmission for the $n^{th}$ time is therefore completed in the time sO+(n−1)T frame. In other words, the position of the paging signals in the frame in each transmission period changes in a regular manner, so that a paging signal that is being transmitted for the second or subsequent time can have its position predicted at the receiver side. Redundant signals are therefore not received, and efficient battery savings can be carried out.

Subframes, paging signals or code words can be used as the units in which battery savings is performed in pager 20. A detailed explanation will now be given for each of these cases.

Figure 6:
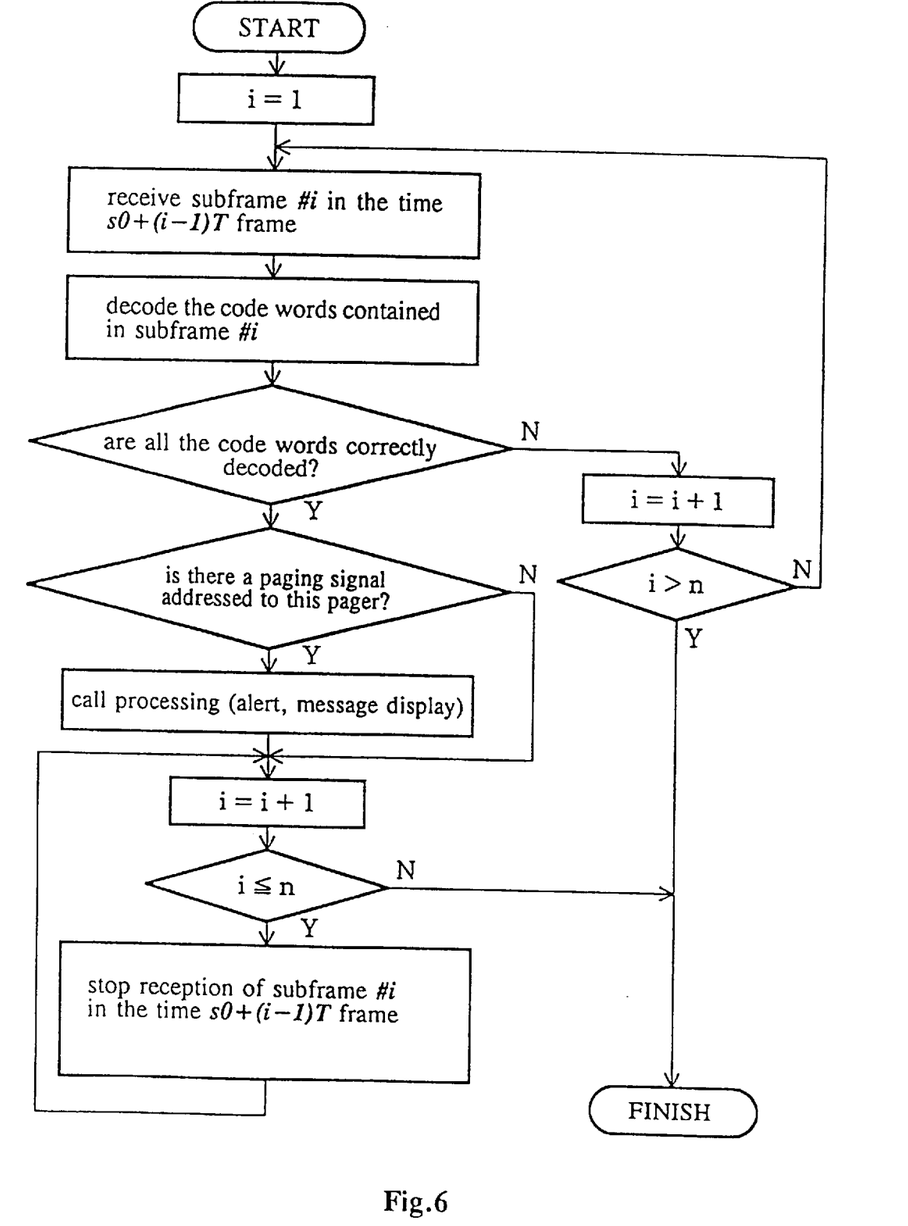
FIG. 6 is a flowchart showing the receiving operation when battery savings is performed in subframe units.

FIG. 6 is a flowchart showing the receiving operation when battery savings is performed in subframe units. When the first subframe in the time sO frame is received following the frame synchronization signal, decoder 23 decodes the code words contained in this subframe. If there are code words which cannot be correctly decoded, the second subframe is received in the next frame and its code words are decoded. This is repeated, and when there has been a paging signal where it has been possible to decode all the code words correctly and which was addressed to the pager in question, call processing (involving sending an alert signal and displaying a message) will be carried out. When it has been possible to decode correctly all the code words of a subframe, the reception of corresponding subframes in subsequent frames is stopped.

The foregoing explanation focused on the paging signals that were inserted in the first subframe of the time sO frame, but the same applies to each frame in which a subframe has been assigned to the group to which this pager belongs. Namely, the paging signals that are inserted in its first subframe are taken as the starting point and subsequent receiving operations are controlled on this basis. In each frame, therefore, after the first subframe has been completely received, battery savings operations relating to the paging signals in the first subframe are started, and reception of the second and subsequent subframes is performed on the basis of the reception result of previous frames.

Figure 7A:
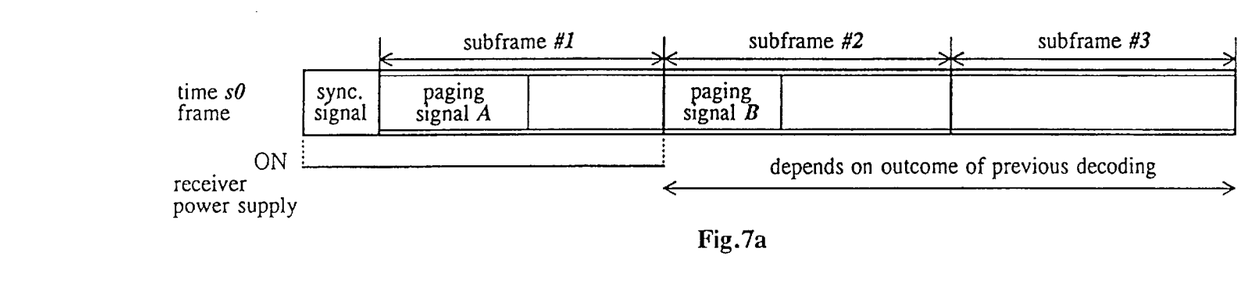
FIGS. 7a, 7b and 7c show the relation between frame constitution and receiving state at frame times sO, sO+T and sO+2T, respectively.
Figure 7B:
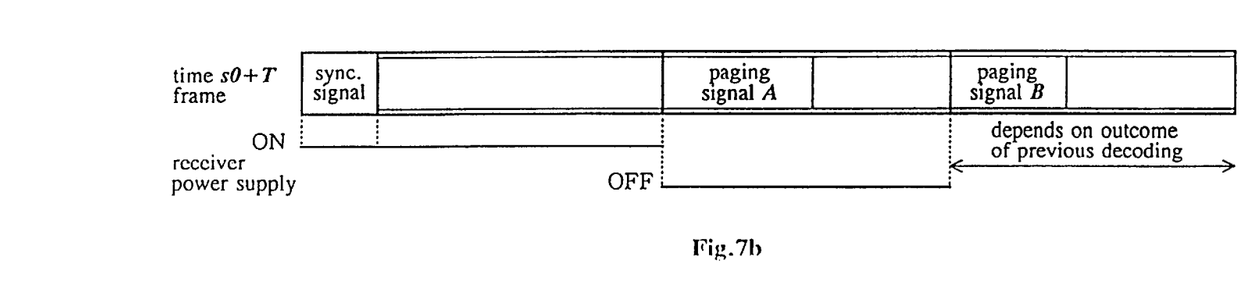
Figure 7C:
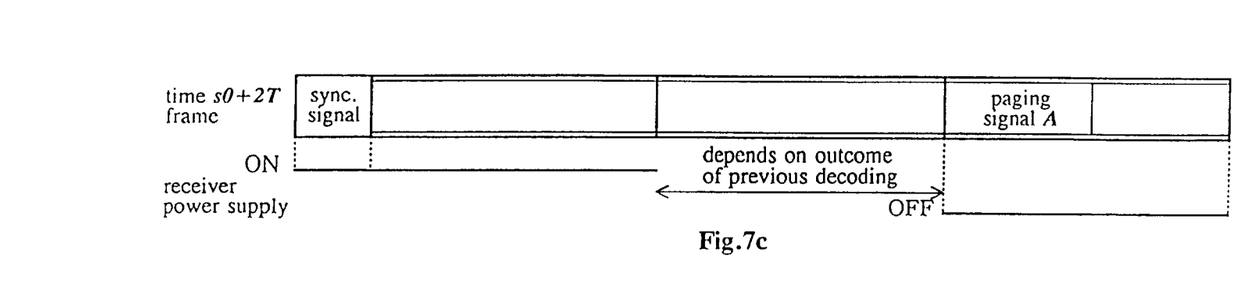

FIGS. 7a, 7b and 7c respectively show the relation between receiving state and the constitution of the time sO, sO+T and sO+2T frames which a single receiver receives with a period T, for the case where an identical paging signal is transmitted three times: in other words, for the case where n=3.

In this example, in the time sO frame, paging signal A, which is being transmitted for the first time, is inserted in the first subframe, while paging signal B, which is being transmitted for the second time, is inserted in the second subframe. The time sO+T frame, which is transmitted in the following transmission period, has a new paging signal inserted in its first subframe, while the paging signal that was transmitted in the first subframe at time sO is inserted in its second subframe and the paging signal that was transmitted in the second subframe at time sO is inserted in its third subframe. At time sO+2T, which is the following transmission period, the signal which is being newly transmitted for the first time is inserted in the first subframe and the paging signal that was transmitted in the first subframe at time sO+T is inserted in the second subframe, while the paging signal that was transmitted in the second subframe at time sO+T is inserted in the third subframe.

The pager receives the first subframe in the time sO frame. The explanation given here will focus on subframes in which paging signal A has been inserted. If all the code words contained in the first subframe are correctly decoded and a paging signal addressed to the pager in question is contained in this subframe, the pager will perform call processing, such as sending an alert signal and displaying a message. If all the code words of the first subframe were correctly decoded in the time sO frame, a synchronization signal for maintaining synchronization is received for the time sO+T frame, and the first subframe of said time sO+T frame is received. However, because it was possible to recognize all the signals of the first subframe in the time sO frame, it is not necessary to receive the second subframe of the time sO+T frame. Likewise, it is not necessary to receive the signals of the third subframe of the time sO+2T frame. Accordingly, once decoding has been carried out correctly, it is not necessary to decode the same signal again, as was previously required, with the result that unnecessary consumption of power is avoided. In this example, consumption of power for receiving subframes #2 and #3 in the time sO frame, subframe #3 in the time sO+T frame, and subframe #2 in the time sO+2T frame, is dependent on the outcome of previous decoding.

Figure 8:
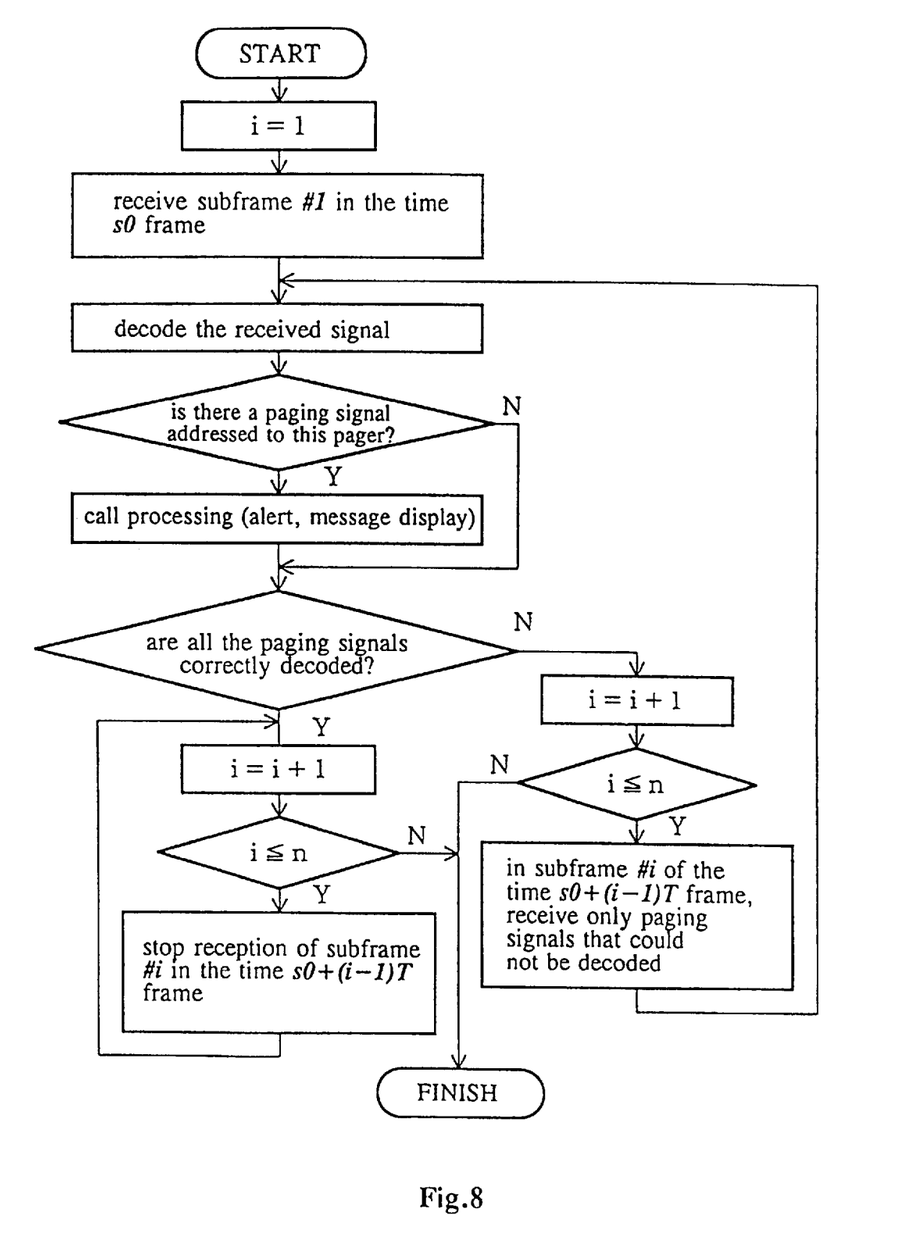
FIG. 8 is a flowchart showing the receiving operation when battery savings is performed in paging signal units.

FIG. 8 is a flowchart showing the receiving operation when battery savings is performed in paging signal units. When the first subframe in the time sO frame is received following the frame synchronization signal, decoder 23 decodes the code words contained in this subframe. If a paging signal addressed to the pager in question was present, call processing (sending an alert and displaying a message) is carried out. If there is a paging signal which cannot be correctly decoded, the same signal position of the corresponding subframe in the next frame is received and its code words decoded, and if there is a paging signal for the pager in question, call processing (sending an alert and displaying a message) is carried out. This is repeated, and when all the paging signals can be correctly decoded, receiving of corresponding subframes in subsequent frames is stopped.

This case is similar to battery savings in subframe units in that in each frame, after the first subframe has been completely received, battery savings operation relating to the paging signals in the first subframe is started, and reception of each paging signal in the second and subsequent subframes is performed on the basis of the outcome of reception in the preceding frames.

In this example, the decision as to whether or not there is a call addressed to a given pager is made when the corresponding paging signal has been correctly decoded, but it is also feasible to store correctly decoded paging signals in memory 25 and to perform the decision at the point in time when all the paging signals of a subframe have been correctly decoded, or when, although there are still some paging signals which have not been correctly decoded, n receptions have been completed.

In similar fashion to FIGS. 7a, 7b and 7c, FIGS. 9a, 9b and 9c show the relation between receiving state and constitution of the time sO, sO+T and sO+2T frames for the case where n=3. The frame constitution used here is the same as the one illustrated in FIGS. 7a, 7b and 7c.

Figure 9A:
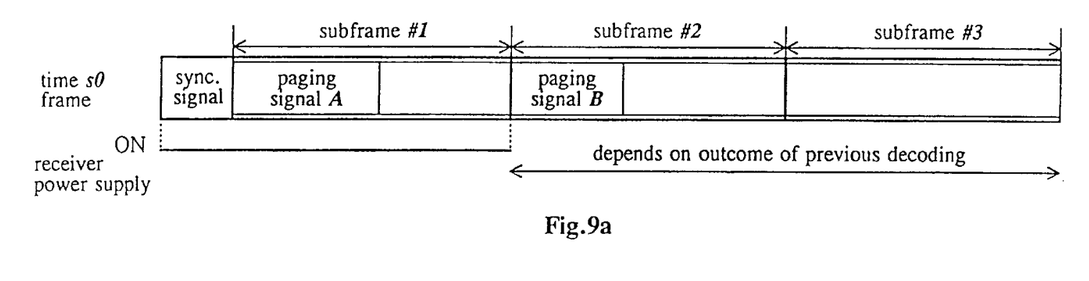
FIGS. 9a, 9b and 9c show the relation between frame constitution and receiving state at frame times sO, sO+T and sO+2T, respectively.
Figure 9B:
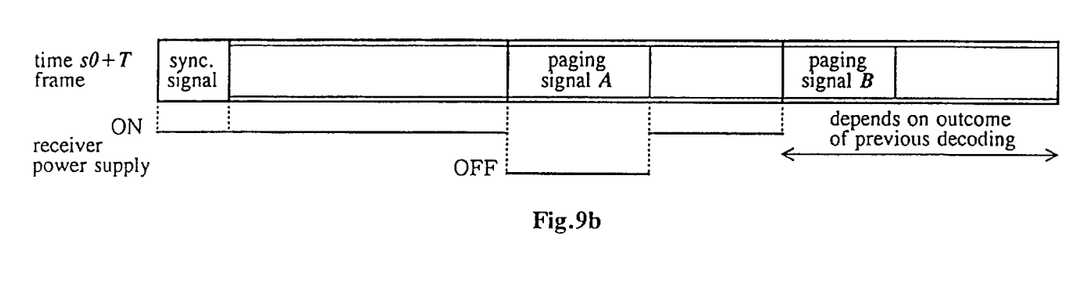
Figure 9C:
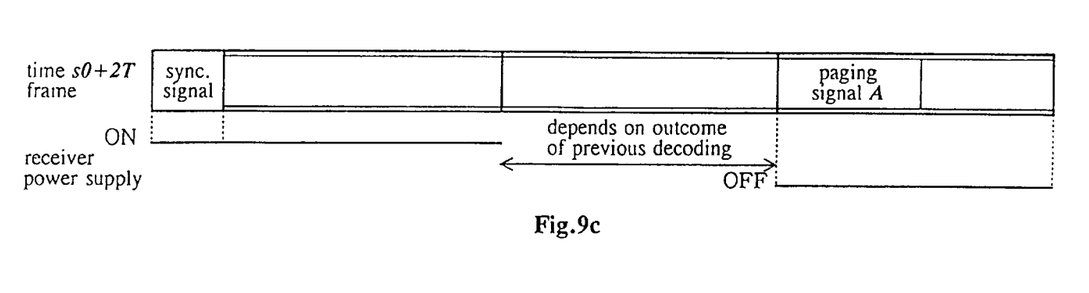

The pager receives the first subframe in the time sO frame. The explanation given here will focus on subframes in which paging signal A has been inserted, and it will be assumed that paging signal A contained in the first subframe has been correctly decoded. If this paging signal A is a paging signal addressed to the pager in question, the pager carries out call processing. In the time sO+T frame, a synchronization signal for maintaining synchronization is received and reception is stopped with a timing corresponding to paging signal A contained in the second subframe. Similarly, in the time sO+2T frame, after the synchronization signal for maintaining synchronization has been received, reception is stopped with a timing corresponding to paging signal A. Accordingly, once decoding has been carried out correctly, it is not necessary to decode the same signal again, as was previously required, with the result that unnecessary consumption of power is avoided.

Figure 10:
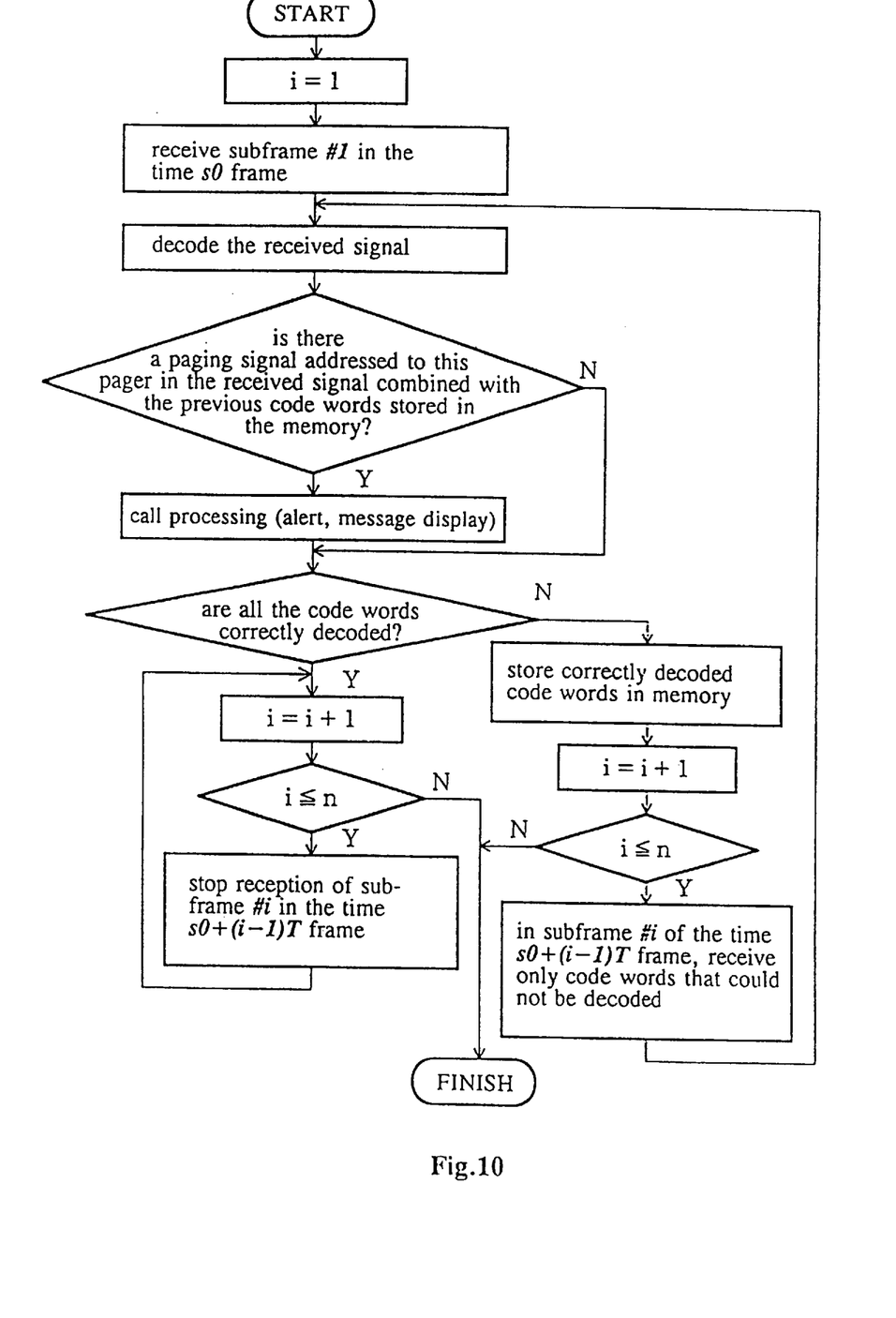
FIG. 10 is a flowchart showing the receiving operation when battery savings is performed in code word units.

FIG. 10 is a flowchart showing the receiving operation when battery savings is performed in code word units. Apart from the fact that the units of battery savings are code words, this operation is the same as when the units are paging signals. When the first subframe in the time sO frame is received following the frame synchronization signal, decoder 23 decodes the code words contained in this subframe. If there has been a paging signal addressed to the pager in question, call processing (sending an alert and displaying a message) is carried out. If there are code words which could not be correctly decoded, any correctly decoded code words are stored in memory 25, the same signal positions of the corresponding subframe in the next frame are received, and the code words in those positions are decoded and combined with the previous code words stored in memory 25, whereupon it is decided whether or not there is a paging signal addressed to the pager in question. If there has been a paging signal for the pager in question, call processing (sending an alert and displaying a message) is carried out. This is repeated, and when all the code words have been correctly decoded, reception of corresponding subframes in subsequent frames is stopped.

In this example, the decision as to whether or not there is a call addressed to a given pager is made when the relevant code words have been correctly decoded, but it is also feasible to store correctly decoded code words in memory 25 and to perform the decision at the point in time when all the code words of a subframe have been correctly decoded, or when, although there are still some code words which have not been correctly decoded, n receptions have been completed.

In similar fashion to FIGS. 7a, 7b and 7c, FIGS. 11a, 11b and 11c show the relation between receiving state and constitution of the time sO, sO+T and sO+2T frames for the case where n=3. The frame constitution used here is the same as the one illustrated in FIGS. 7a, 7b and 7c.

Figure 11A:
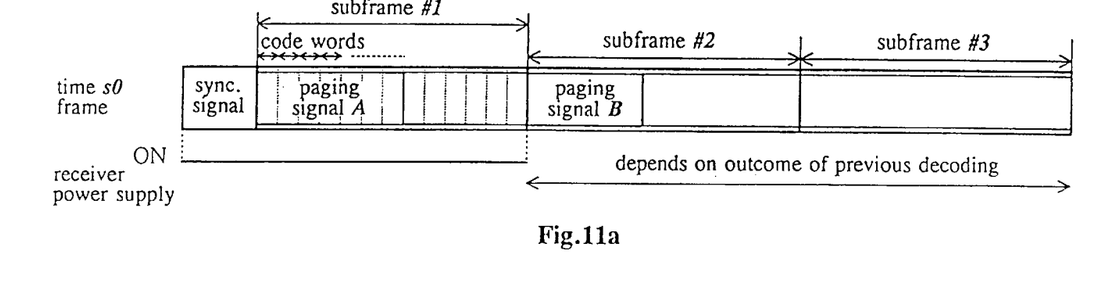
FIGS. 11a, 11b and 11c show the relation between frame constitution and receiving state at frame times sO, sO+T and sO+2T, respectively.
Figure 11B:
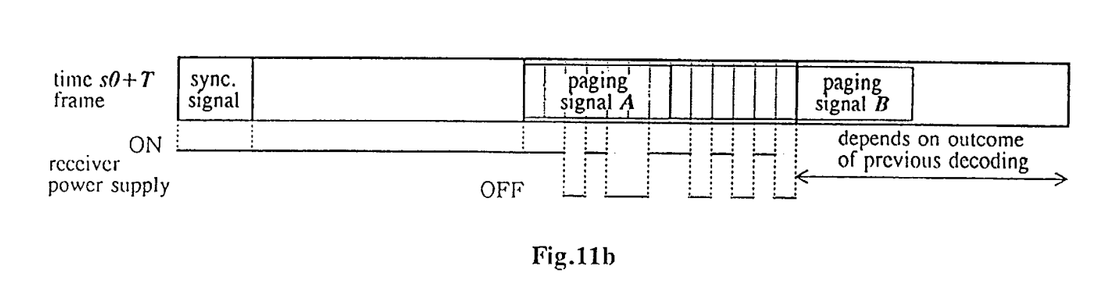
Figure 11C:
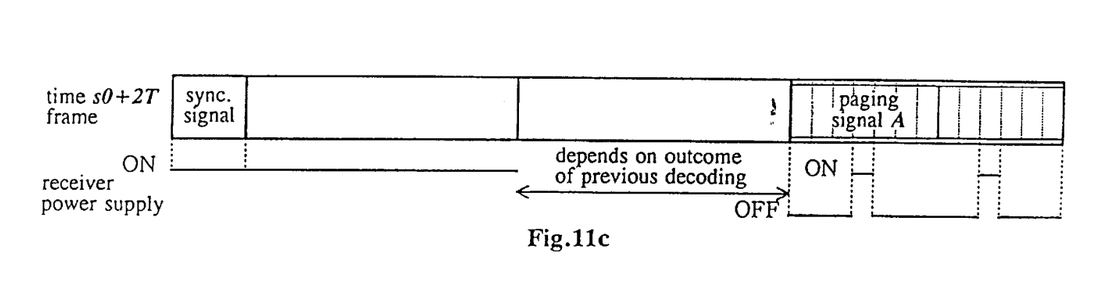

The pager receives the first subframe in the time sO frame. The explanation given here will focus on subframes in which paging signal A has been inserted, and it will be assumed that several code words contained in the first subframe have been correctly decoded. In this case, in the time sO+T frame, a synchronization signal for maintaining synchronization is received and reception is stopped with a timing corresponding to the correctly decoded code words contained in the second subframe. Similarly, in the time sO+2T frame, after the synchronization signal for maintaining synchronization has been received, reception is stopped with a timing corresponding to the correctly received code words. Accordingly, once decoding has been carried out correctly, it is not necessary to decode the same code words again, as was previously required, with the result that unnecessary power consumption is avoided.

Figure 12A:
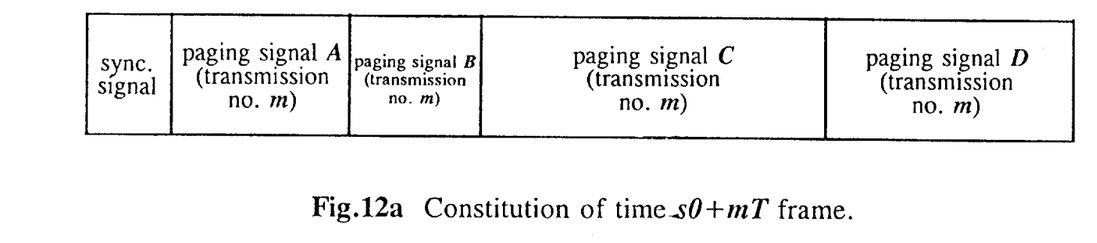
Figure 12B:
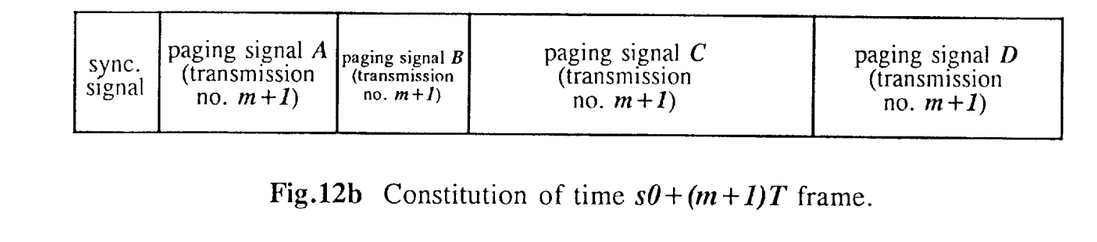
FIG. 12b shows the constitution of the time sO+(m+1)T frame.

In the foregoing embodiments, explanations were given of cases in which frames were divided into fixed-length subframes, but this invention can also be implemented using other frame constitutions. FIG. 12a and FIG. 12b show an example of such an alternative frame constitution. FIG. 12a shows the constitution of a time sO+mT frame, while FIG. 12b shows the constitution of a time sO+(m+1)T frame. In this example, a frame comprising the same combination of a plurality of paging signals is transmitted n times. Because the position of the paging signals does not change over n frames, the position of each individual paging signal can easily be inferred despite the fact that the paging signals are of different lengths.

Furthermore, it is by no means essential to provide a synchronization signal in each frame. For example, a synchronization signal may be provided every plural number of frames. This invention can likewise be implemented when the address and message of the paging signals are arranged in separate fields: for example, if the addresses of a plurality of paging signals are brought together and arranged in a single field, and if the messages of the paging signals are arranged in a field following this, in correspondence with the position of the addresses.

We claim:

1. A mobile radio communication system comprising:

a plurality of receivers each having an assigned address; and a base station which transmits a paging signal a plurality n times to at least one of said plurality of receivers, said paging signal including:

address information corresponding to a respective assigned address of said at least one of said plurality of receivers, a paging message, and error check bits for said paging signal;

said at least one of said plurality of receivers including:

a power supply, a receiving part switchably powered by said power supply, error correction means for performing at least one of error detection and error correction of said paging signal received by said receiving part using said error check bits, means for determining timing positions of said paging signal with respect to a synchronization signal each of said plurality n times said paging signal would be received by said at least one of said plurality of receivers, in accordance with a prearranged rule, and receiver power shut-off means for removing said power from said receiving part after a single reception of said paging signal by said at least one of said plurality of receivers, and after said single reception of said paging signal is confirmed as being error-free by said error correction means, and in accordance with said prearranged rule to selectively remove said power during said timing positions of subsequent confirmed ones of said plurality n transmissions of said paging signal.

2. A mobile radio communication system according to claim 1, wherein:

said base station transmits said paging signal said plurality n times in each of a respective plurality n frames; and said means for determining said timing positions of said paging signals determines said timing positions based on a timing from a synchronization signal indicating a start of at least one of said plurality n frames.

3. A mobile radio communication system according to claim 2, wherein:

each of said plurality n frames includes a plurality n of fixed-length subframes;

said base station transmits a new paging signal in a first subframe after said synchronization signal of a respective new one of said plurality n frames;

said base station transmits said paging signal in a subframe m corresponding to an $m^{th}$ time of said plurality n times that said paging signal is transmitted, m being less than or equal to n;

said timing positions of said subsequent transmissions of said paging signal are determined from a correspondence between a number of said plurality n subframes corresponding to an equal number of said plurality n times that said paging signal has being transmitted; and said receiver power shut-off means selectively removes said power supply from said receiver part subsequent to said confirmation that said subframes are error-free by said error correction means for time periods which have durations limited to when said subframes would otherwise be subsequently received by said receiver.

4. A mobile radio communication system according to claim 2, wherein:

each of said plurality n frames includes a plurality n of fixed-length subframes;

said base station transmits a new paging signal within a first subframe after said synchronization signal of a respective new one of said plurality n frames;

said base station transmits said paging signal in a subframe m corresponding to an $m^{th}$ time of said plurality n times that said paging signal is transmitted, m being less than or equal to n;

said timing positions of said subsequent transmissions of said paging signal are determined from a correspondence between a number of said plurality n subframes corresponding to an equal number of said plurality n times that said paging signal has being transmitted; and said receiver power shut-off means selectively removes said power supply from said receiver part subsequent to said confirmation that said paging signal is error-free by said error correction means for a time period which has a duration limited to when said paging signal in a respective one of said plurality n of subframes would otherwise be subsequently received by said receiver.

5. A mobile radio communication system according to claim 2, wherein:

each of said plurality n frames includes a plurality n of fixed-length subframes;

said paging message includes a plurality of code words, each of said plurality of code words corresponding to a smallest word for which said error correction means can perform said at least one of error detection and error correction using said error check bits;

said base station transmits a new paging signal in a first subframe after said synchronization signal of a respective new one of said plurality n frames;

said base station transmits said paging signal in a subframe m corresponding to an $m^{th}$ time of said plurality n times that said paging signal is transmitted, m being less than or equal to n;

said timing positions of said subsequent transmissions of said paging signal are determined from a correspondence between a number of said plurality n subframes corresponding to an equal number of said plurality n times that said paging signal has being transmitted; and said receiver power shut-off means selectively removes said power supply from said receiver part subsequent to confirmation that ones of said code words are error-free by said error correction means for time periods which have durations limited to when said ones of said plurality of code words in a respective one of said plurality n of subframes would otherwise be subsequently received by said receiver.

6. A mobile radio communication system according to any one of claim 1 to 5, wherein:

said receiver is a receive-only pager.

7. A mobile radio communication system according to claim 3, wherein said receiver shut-off means selectively removes said power supply from said receiver part subsequent to said confirmation that said subframes are error-free and for a plurality of time periods respectively limited to when said plurality of subframes would otherwise be subsequently received by said receiving part, said subframes being included within the same frame.

8. A mobile radio communication system according to claim 4, wherein said receiver shut-off means selectively removes said power supply from said receiver part subsequent to a confirmation that a plurality of paging signals are error-free and for a plurality of time periods respectively limited to when a plurality of paging signals would otherwise be subsequently received by said receiving part, said paging signals being included within the same frame.

9. A mobile radio communication system according to claim 5, wherein said receiver shut-off means selectively removes said power supply from said receiver part subsequent to said confirmation that said code words are error-free and for a plurality of time periods respectively limited to when said plurality of code words would otherwise be subsequently received by said receiving part, said code words being included with the same frame.

10. A mobile radio communication system according to claim 1, wherein:
   a plurality of paging signals following said synchronization signal are transmitted by said base station and received by at least one of said plurality of receivers each of said plurality n times, and wherein
   receiver power shut-off means selectively removes power from said receiving part of at least one of said plurality of receivers after the reception of paging signals are confirmed as error-free and for a plurality of time periods respectively limited to said plurality of said subsequent transmissions of said paging signals, said time periods occurring before the next transmission of said synchronization signal.

11. A radio communication system receiver comprising:
   storage means for storing an address assigned to said radio communication system receiver;
   receiving means for receiving a paging signal transmitted by a base station a plurality n times, said paging signal including address information corresponding to said address assigned to said radio communication system receiver;
   error correction means for performing at least one of error detection and error correction of said paging signal received by said receiving means using error check bits contained in said received paging signal;
   call processing means for performing call processing when said address information included in said received paging signal matches said assigned address of said radio communication system receiver;
   means for predicting timing positions of when said remaining ones of said plurality n of transmissions of said paging signal would be received for after said first one of said plurality n of transmissions of said paging signal is received based on when said first one of said plurality n of transmissions of said paging signal was received; and
   receiver power shut-off means for selectively removing said power from said receiving means after a single reception of said paging signal by said receiving means and after said single reception of said paging signal is confirmed as being error-free by said error correction means, for a time period which has a duration limited to when said confirmed portions of said paging signal would otherwise be subsequently received by said receiver means.

12. A radio communication system receiver according to claim 11, wherein
   a plurality of paging signals are received by said receiving means following a synchronization signal each of said plurality of n times; and wherein
   receiver power shut-off means selectively removes power from said receiving means for a plurality of time periods respectively limited by said plurality of said paging signals, said plurality of time periods occurring before the next transmission of said synchronization signal.

13. A method of receiving a paging message from a base station, comprising steps of:
   assigning a unique address to each of a plurality of receivers;
   transmitting a paging signal a plurality n times from said base station to at least one of said plurality of receivers;
   performing at least one of error detection and error correction on said paging signal when received by said at least one of said plurality of receivers using error check bits;
   determining timing positions of said paging signal with respect to a synchronization signal each of said plurality n times said paging signal would be received by said at least one of said plurality of receivers; and
   removing power from a receiving part of said at least one of said plurality of receivers after a single reception of said paging signal by said at least one of said plurality of receivers and after said paging signal is confirmed as being error-free and during a time period which has a duration limited to said determined timing positions of subsequent confirmed ones of said plurality n transmissions of said paging signal.

14. A method of receiving a paging message from a base station according to claim 12, wherein
   a plurality of paging signals following said synchronization signal are transmitted by said base station and received by said receiving means each of said plurality n times; and wherein
   power is selectively removed from said receiving part of at least one of said plurality of receivers for a plurality of time periods respectively limited to said plurality of paging signals said time period occurring before the next transmission of said synchronization signal.

* * * * *